US 6,559,813 B1

(12) United States Patent
DeLuca et al.

(10) Patent No.: US 6,559,813 B1
(45) Date of Patent: May 6, 2003

(54) SELECTIVE REAL IMAGE OBSTRUCTION IN A VIRTUAL REALITY DISPLAY APPARATUS AND METHOD

(76) Inventors: Michael DeLuca, 734 Camino Gardens La., Boca Raton, FL (US) 33432; Joan DeLuca, 734 Camino Gardens La., Boca Raton, FL (US) 33432

(*) Notice: Subject to any disclaimer, the term of this patent is extended or adjusted under 35 U.S.C. 154(b) by 0 days.

(21) Appl. No.: 09/494,976

(22) Filed: Jan. 31, 2000

Related U.S. Application Data (63) Continuation-in-part of application No. 08/108,814, filed on Jul. 1, 1998, now Pat. No. 6,064,354.

(51) Int. Cl.$^7$ .................................................. G09G 5/00
(52) U.S. Cl. .............................. 345/8; 345/629; 359/630
(58) Field of Search ........................ 345/7–9, 629, 345/630, 631, 632, 633, 634; 359/13, 629, 630; 348/239, 362; 353/28, 29, 97

(56) References Cited

U.S. PATENT DOCUMENTS

| | | | |
|---|---|---|---|
| 4,808,978 A | * 2/1989 | Vernay | 340/980 |
| 5,025,314 A | 6/1991 | Tang et al. | |
| 5,034,809 A | * 7/1991 | Katoh | 348/360 |
| 5,153,569 A | * 10/1992 | Kawamura et al. | 345/8 |
| 5,168,531 A | 12/1992 | Sigel | |
| 5,239,373 A | 8/1993 | Tang et al. | |
| 5,491,510 A | 2/1996 | Gove | |
| 5,694,142 A | 12/1997 | Dumoulin et al. | |
| 5,767,842 A | 6/1998 | Korth | |
| 5,838,458 A | 11/1998 | Tsai | |
| 5,886,822 A | 3/1999 | Spitzer | |
| 5,913,591 A | 6/1999 | Melville | |
| 5,930,377 A | 7/1999 | Powell et al. | |
| 6,008,946 A | 12/1999 | Knowles | |
| 6,118,414 A | 9/2000 | Kintz | |

* cited by examiner

Primary Examiner—Kent Chang
(74) Attorney, Agent, or Firm—IdeoCo.com (57) ABSTRACT

A virtual reality system (200–323) stereoscopically projects a virtual reality images including a three dimensional image (245) having an interface image (250') in a space observable by a user (100). The display system includes a substantially transparent display means (200) which also allows real images of real objects (850) to be combined or superimposed with the virtual reality images. Selective areas or characteristics of the real images are obstructed by a selective real image obstructer (860) to enhance viewing of selected virtual reality images while providing for viewing or real images or virtual images combined with real images in other viewing areas. The display system includes either a stereoscopic headset display system or a heads-up display system. The selective real images obstructer is a gray scale liquid crystal display included with the display system providing for adjustment of the size, shape and/or transparency of the obstruction of real images. The obstruction of real images may be adjusted in response to information for generating the virtual image, manual inputs or processing of real images by video cameras (310' and 320'). Other selective real image obstructions include filtering a portion of the spectrum of visible light associated with the real images.

29 Claims, 8 Drawing Sheets

SELECTIVE REAL IMAGE OBSTRUCTION IN A VIRTUAL REALITY DISPLAY APPARATUS AND METHOD

This application is a continuation-in-part of application Ser. No. 09/108,814 filed Jul. 1, 1998 now U.S. Pat. No. 6,064,354.

FIELD OF THE INVENTION

This invention generally relates to the area of image displays and more particularly to transparent image displays and virtual reality user interfaces.

BACKGROUND OF THE INVENTION

Graphical user interfaces have become a standard for interfacing between a user and a computer. Such interfaces are in wide use in computer operating system interfaces produced by Apple, Microsoft and others. These interfaces are limited in that they are intended for interfacing between a user and a computer having a two dimensional display such as a CRT or LCD. A user activates the interface with a key board and or a pointing device such as a mouse pointing to an icon on the display. Advancements have been made with the advent of a touch screen which allows a user to approximately contact the icon or intended area of the graphical user interface in order to use the interface. However, contact with the touch screen can contaminate the display area of the screen with finger prints and other types of smudges. Also, constant physical contact with the touch screen can result in its mechanical failure. Thus, what is needed is a way to contact user interface images without contacting a keyboard or a mouse or the display itself.

Three dimensional image displays are improving. Several types of three dimensional displays are known including stereoscopic displays which display a virtual three dimensional image using filters to highlight images intended for each eye of the viewer, thereby providing a stereoscopic or three dimensional affect. Such systems alternately flash images for the left and right eye of the user and require a filter for each eye, usually included in glasses worn by the viewer. Systems are in public use which require glasses may have color filters, orthogonally polarized lenses, or actively switched lenses, and the display is correspondingly modulated with left and right eye images to provide the three dimensional effect. Furthermore, stereoscopic displays which do not require glasses have been described, descriptions are included in U.S. Pat. No. 4,987,487, Jan. 22, 1991, to Ichinose et al. entitled Method of stereoscopic images display which compensates electronically for viewer head movement, and U.S. Pat. No. 5,365,370, Nov. 15, 1994, to Hudgins entitled Three dimensional viewing illusion with 2D display. Yet another stereoscopic display system in completely contained in a head set worn apparatus as described in U.S. Pat. No. 5,673,151 Sep. 30, 1997 to Dennis entitled Image correction in a virtual reality and heads up display. The aforesaid patents are incorporated by reference. The aforesaid stereoscopic displays allow the viewer to simultaneously observe both a stereoscopic object, appearing to be generally set apart in three dimensions from the image projection means, and a physical object, such as the hand of the user, in approximately the same perceived space. What is needed is a method and apparatus by which the intersection of the physical object and the stereoscopic object can form a user interface with a computer system.

Stereoscopic headsets are capable of generating independent images for each eye and thus provide a three-dimensional virtual reality image for the viewer. Such headsets have the advantage of providing the experience of a substantially large display system, such as a movie theater screen, at a significantly reduced price and in a substantially small area. Some headsets are opaque while others are transparent. Opaque headsets entirely block the user's view of real images normally observable when a headset is not worn. Opaque headsets have the advantage of enhancing the virtual reality image but the disadvantage of preventing the viewer from observing real images. The inability of the observer to view real images while wearing the headsets inhibits most normal social functions such as walking or having a normal conversation with others in observer's vicinity. On the other hand, transparent headsets allows the observer to see both real images and virtual reality images projected by the headset, the virtual reality images appearing superimposed upon reality's real images. This has the advantage of allowing the user to view reality while wearing such a headset, thus enabling the user to conduct most normal social functions such as walking or carrying on a normal conversation. However, the quality of the virtual reality image may be compromised when superimposed upon real images because the real images may distract the user from the content of the virtual reality image, thus detracting from the virtual reality experience.

Thus, what is needed is a virtual reality viewing system that provides for the advantages of both transparent and opaque viewing systems while reducing the disadvantages of both.

OBJECT OF THE INVENTION

It is therefor an object of the invention to provide a three dimensional display system capable of determining an intersection of a physical object with a three dimensionally displayed object in a space where the three dimensional object is viewed and generating a control signal in response thereto. The control signal may cause modification of the displayed image or control another device. The display system is also capable of extending the physical object with a three dimensional extension image and then using the extended image to determine the intersection.

It is another object of the present invention to provide a transparent display system for viewing real objects beyond the display which actively obstructs transparency to enhance viewing of displayed virtual images and real images viewable through the display.

DETAILED DESCRIPTION OF THE INVENTION

Figure 1:
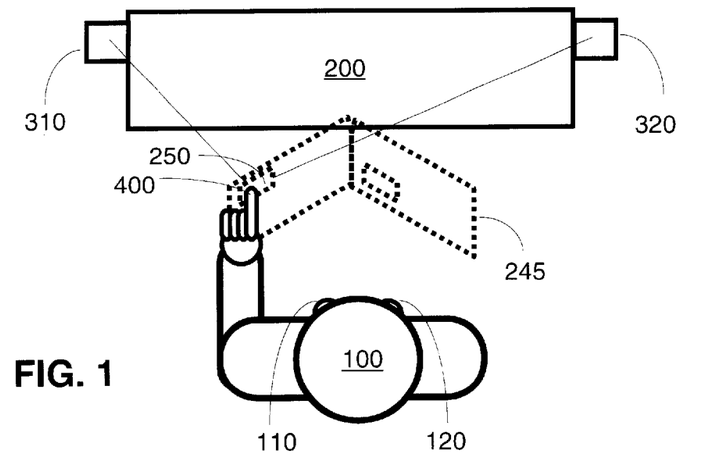
FIG. 1 shows a perspective view of a user causing an intersection of a physical object with a three dimensional stereoscopic object projected by a display.

FIG. 1 shows a perspective view of a user causing an intersection of a physical object with a three dimensional stereoscopic object projected by a display. The user 100 has left and right eyes 110 and 120 which are used to view a display 200 which projects a three dimensional stereoscopic object 245 in a space between the user and the display. The stereoscopic object has a stereoscopic interface image 250. Using pattern recognition and triangulation, images from video cameras 310 and 320 are used to determine the position of physical objects within the space, such as the position of the user 100 and the user's finger 400. As will be described herein, a control signal is generated in response to the intersection of the interface image 250 and a physical object 400. For example, the stereoscopic object 245 projected by the display 200 could be the image of an open book, including readable text on pages of the book. Interface image 250 could be an icon indicating that contact with the icon would cause a page in the book to turn. When the finger tip 400 of the user touches the icon 250, a control signal is generated causing a new image 245 of a book to be displayed with a turned page. The stereoscopic three dimensional image has the advantage of being projected in a space, no physical contact with a keyboard, mouse or touch screen is needed to generate a control signal to turn a page of the book. Rather, an intuitive action of a user appearing to make physical contact with a three dimensional image in the space causes generation of the control signal. The user sees the interface image in a three dimensional space and simply uses a finger to touch the interface image to cause a response. The user has an actual view of the finger, with which the user has had a life time to become familiar, touching a virtual stereoscopic object similar to the way the user has spent a life time touching physical objects. This provides for an intuitive interface.

The stereoscopic projector 200 can be any of several display means capable of displaying three dimensional images. Some projectors require the user to wear colored, polarized of active image filter glasses (not shown) to observe the three dimensional image while others are totally contained within a display headset worn by the user, yet another requires only a display separate from the user and no glasses at all. While all displays capable of displaying a three dimensional image are contemplated, the latter is preferred because of the convenience to a user requiring no physical contact with the means necessary to display three dimensional images.

Figure 2:
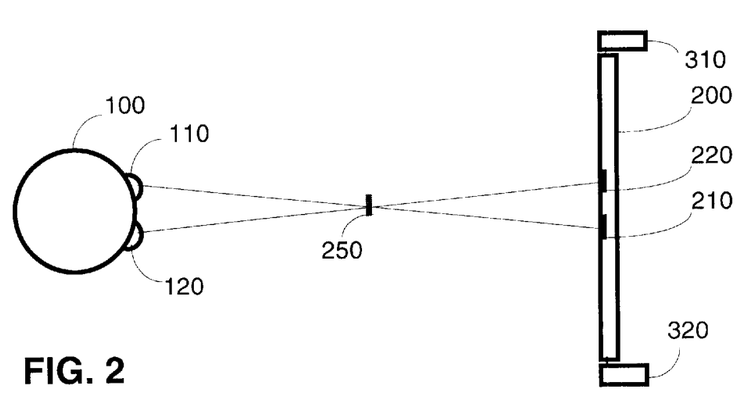
FIG. 2 shows the display of the stereoscopic interface image.

FIG. 2 shows the display of the stereoscopic interface image. Display 200 displays an image 210 for viewing by the left eye 110 of the user 100 while image 220 displayed for viewing by the right eye 120 of user 100. As a result, stereoscopic interface image 250 appears to occur in a space between the user 100 and the display 200 at a position indicated by the intersection of a line from eye 110 to image 210 and a second line from eye 120 to image 220.

Figure 3:
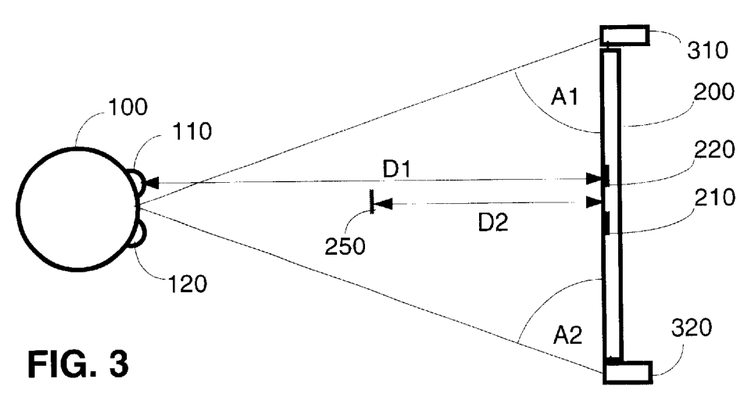
FIG. 3 shows determination of the position of the stereoscopic interface image.

FIG. 3 shows determination of the position of the stereoscopic interface image. The position is dependent upon the distance between images 210 and 220, the distance between the eyes 110 and 120 of the user 100 and the position of the user including distance D1 between the display 200 and the user. Preferably, the size of display 200 is predetermined and the image 250 is determined by the computer generating the image. Consequently the distance between images 210 and 220 is also predetermined. The distance between the eyes 110 and 120 can be entered by the user as a calibration procedure prior to operating the user interface means, or can be determined by pattern recognition from images recorded by cameras 310 and 320. The position of the user including the distance between the user and the display can determined by pattern recognition by the images recorded by cameras 310 and 320 to determine a common point relative to the user. Pattern recognition of images of faces and other physical objects are well known, such descriptions can be found in references including U.S. Pat. No. 5,680,481 Oct. 21, 1997 to Prasad et al. entitled Facial feature extraction method and apparatus for a neural network acoustic and visual speech recognition system, U.S. Pat. No. 5,715,325 Feb. 3, 1998 to Bang et al. entitled Apparatus and method for detecting a face in a video image, and U.S. Pat. No. 5,719,951 Feb. 17, 1998 to Shackeleton et al. entitled Normalized image feature processing, which are hereby incorporated by reference. The common point may be the area between the eyes of the user. Alternately, the identification of the common point may be simplified by adding a fiducial mark at the desired point to assist in identifying the desired point and its corresponding angle. Such a mark could be a colored dot placed between the eyes or at the tip of the nose, or marks on glasses worn by the user, the mark could be further illuminated to simplify patter recognition of images received by the video camera. Thereafter, triangulation is performed to determine the position of the user including D1. D1 is a geometric solution of a predetermined distance between cameras 310 and 320 angles A1 and A2 found from images recorded by cameras 310 and 320. Thus, the position including D2 of interface image 250 is readily geometrically determined from the aforesaid determinations. It should be appreciated that the three dimensional display means can be constructed such that the position of the user and the distance DI is predetermined in order for the user to correctly view the stereoscopic effect. Furthermore, the distance between the eyes 110 and 120 can also be predetermined to be an average distance between eyes of a number of users. This simplifies determination of the position of interface image 250 without departing from the spirit and scope of the invention. FIG. 3 shows determining the position of interface image 250 from a top view, it should be appreciated that a similar analysis applies to determining the position of interface image 250 from a side view, thus providing a three dimensional position of the user 100 and the interface image 250.

Figure 4:
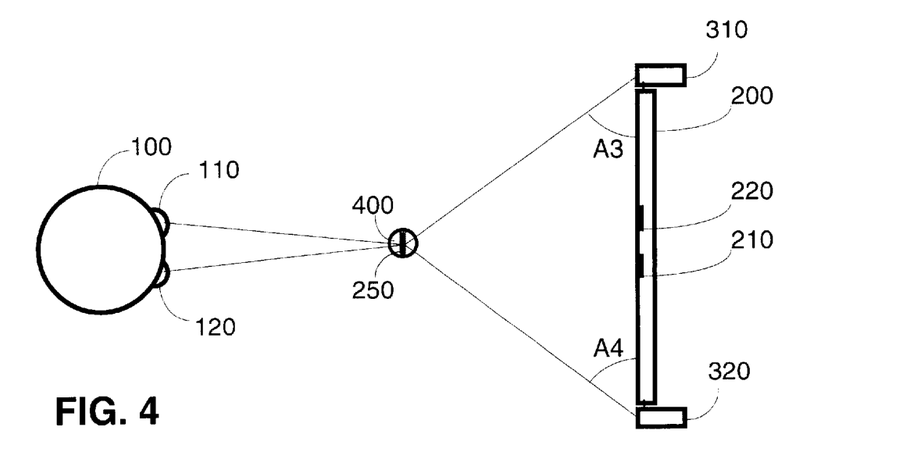
FIG. 4 shows a physical object intersecting the stereoscopic interface image.

FIG. 4 shows a physical object intersecting the stereoscopic interface image. Physical object 400 can be any physical object where the position of the object can be determined. In FIG. 1, the physical object corresponds to the tip of the finger of the user. Pattern recognition is used to determine the position of the physical object and the tip of the finger of the user. Alternately a fiducial mark such as the aforementioned colored or illuminated dot may be added to assist pattern recognition. Once the desired point is identified from the images recorded by cameras 310 and 320, angles A3 and A4 may be determined. Given angles A3 and A4, and the predetermined distance between cameras 310 and 320, the position of the physical object 400 may be geometrically determined. FIG. 4 shows determining the position of the physical object from a top view, it should be appreciated that a similar analysis applies to determining the position of the physical object from a side view, thus providing a three dimensional position of physical object 400. Upon determination of a substantial intersection of the position of interface image 250 and physical object 400, a control signal is generated. The control signal may result in the modifications of the image or the control another device such as a printer or modem.

FIG. 4 shows a computer system which stereoscopically projects a three dimensional object having an interface image in a space observable by a user. The user controls the movement of a physical object within the space while observing both the three dimensionally projected object and the physical object. The computer system monitors the position of the user to determine the position of the interface image within the space and further monitors the movement of the physical object to determine its position. A control signal is generated in response to the position of the physical object intersecting the position of the interface image. For example, a word processing program is indicated by an interface image such as an icon including the letter "W" three dimensionally projected within the space. The word processing program is activated when the user's finger moves within the space to touch the projected icon. The interface allows the user to observe the projected icon, physical finger and their intersection within the space.

Figure 5:
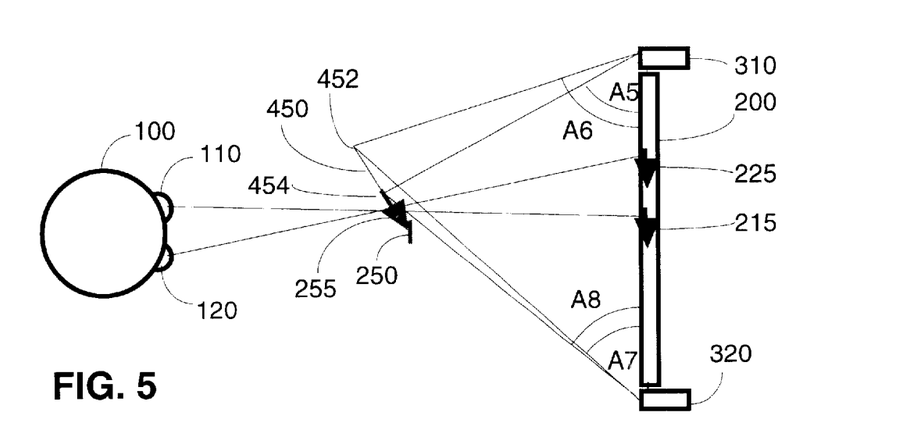
FIG. 5 shows a stereoscopic extension of the physical object intersecting the stereoscopic interface image.

FIG. 5 shows a stereoscopic extension of the physical object intersecting the stereoscopic interface image. In this alternative embodiment, the physical object is shown as a bar 450 having a first and second end 452 and 454 with a stereoscopic extension image 255 projecting from end 454. The orientation and position of the physical object is determined by determining the positions of end points 452 and 454 from images recorded by cameras 310 and 320. The end points can be found by pattern recognition or by adding of differing colored fiducial marks at either end of the bar. The position of end point 452 may be determined from angles A6 and A8 of images from cameras 310 and 320 respectively while the position of end point 454 may be determined from angles A5 and A7 from cameras 310 and 320 respectively. FIG. 5 shows determining the position of the end points from a top view, it should be appreciated that a similar analysis applies to determining the position of the end points from a side view, thus providing a three dimensional position of end points 452 and 454. From the position of the two end points, the orientation of the physical object 450 may be determined. In response to the determined position and orientation of physical object 450 and the determined position of user 100, a stereoscopic extension image 255 is created such that the extension image appears to be an extension of the physical object. In FIG. 5, the extension image 255 is shown as a line extending along the line of physical object 450 with an arrow head tip. The length and shape of the extension image is predetermined and may vary from application to application. The stereoscopic extension image 255 is created by displaying images 215 and 225 on display 200 for view by eyes 110 and 120 respectively. A control signal is generated when the position of a predetermined portion of the stereoscopic extension image, such as the tip of the arrow head, intersects the position of the stereoscopic interface image.

Figure 6:
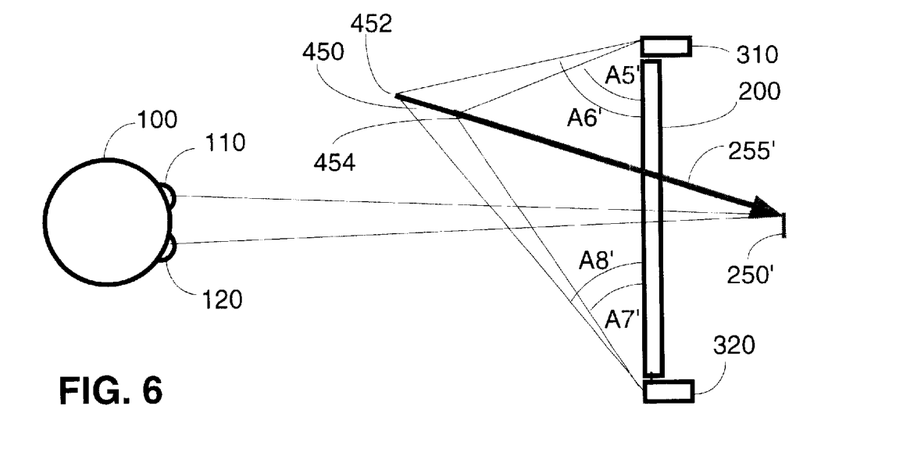
FIG. 6 shows a stereoscopic extension image of the physical object intersecting the stereoscopic interface image wherein the intersection is behind the display.

FIG. 6 shows a stereoscopic extension image of the physical object intersecting the stereoscopic interface image wherein the intersection is behind the display 200. FIG. 6 is similar to FIG. 5 in that both show a stereoscopic extension image, 255 and 255', intersecting a stereoscopic interface image, 250 and 250'. However in FIG. 5 the intersection is in front of display 200, while in FIG. 6 the intersection is behind display 200. The position and orientation of physical object 450 is determined by determining the position of end points 452 and 454 via cameras 310 and 320 and angles A5', A6', A7' and A8'. In this case the resulting extension image 255' is shown to have a substantially longer predetermined length than image 255 of FIG. 5. If display 200 were not a heads-up stereoscopic display, but rather a conventional LCD or CRT, then the intersection between a physical object and an interface image could not occur if the position of the interface image were behind the display because either the space is physically occupied by another object or the user could not see the physical intersection through the display. The extension image has the advantage of enabling intersections to occur in positions appearing behind the display 200, or in other positions out of reach of the user, while allowing the user to directly view the physical object used to cause the intersection.

Physical object 450 has been referred to as a bar, but it should be appreciated that the physical object could be any of a number of physical objects including the finger of the user where one end is the finger tip and the other end is a joint of the finger. Fiducial marks could be added to the points on the finger to facilitate pattern recognition of images recorded by the cameras. While the extension image is shown as a line with an arrow head, other types of extension images may be used depending upon the application. The stereoscopic extension may be considered a virtual end effect for a physical handle, a wide variety of end effects may be created by the computer system. For example a paint brush could be used for paining a virtual object, the handle being the physical object and the brush bristles and paint color the being end effect while the interface image appears as a paint canvas mounted on and three dimensional easel image. In a medical application, the physical object could be the handle and the end effect extension image the blade of a scalpel while the stereoscopic interface image part of a three dimensional image simulating surgery. Alternately in a game application the stereoscopic extension image could be a laser beam, rocket, bullet or bolt of lightning appearing to emanate from the finger of the user along a three dimensional vector defined by the finger, the stereoscopic interface image may be a villain or enemy tank moving in three dimensions.

It should also be appreciated that the position and orientation of the user 100 and physical object 450 have been described as being determined by two cameras with pattern recognition which triangulate in order to determine the corresponding position and orientation. In a heads up stereoscopic head set display, the cameras could be preferably mounted on the head set for visually monitoring physical objects in same space in which the user observes the projected stereoscopic images. In alternate embodiments other techniques may be used to determine the aforesaid positions and orientations without departing from the spirit and scope of the invention.

Figure 7:
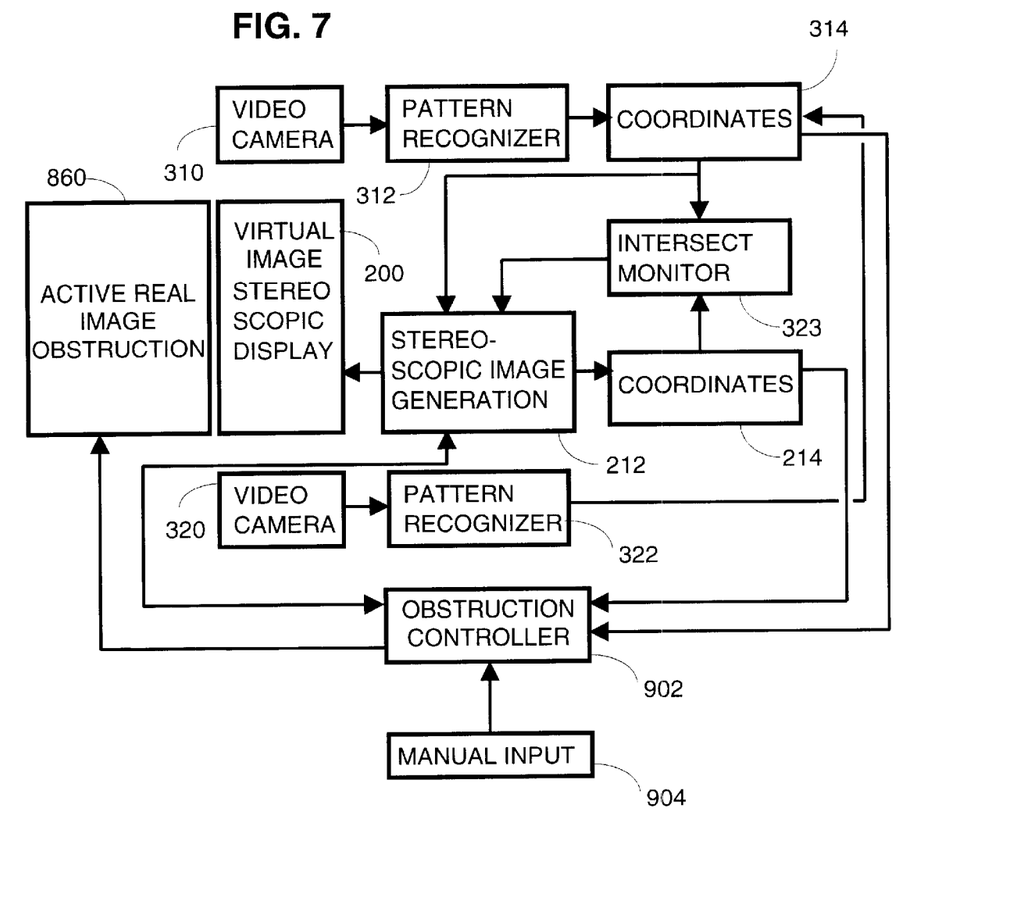
FIG. 7 shows a block diagram of the user interface system operating in accordance with the present invention.

FIG. 7 shows a block diagram of the user interface system operating in accordance with the present invention. A stereoscopic display 200 displays stereoscopic images generated by stereoscopic image generation means 212 in a manner know in the art. The stereoscopic display may be a CRT or LCD screen requiring filter glasses to be worn by the user to direct the appropriate image to the corresponding eye of the user. Alternately, it may be a heads up stereoscopic display worn by the user. Preferably display 200 is a display means especially adapted to displaying stereoscopic images without the aid of devices worn by the use. Cameras 310 and 320 produce images which are analyzed by pattern recognizers 312 and 322 which identify certain points of the image and their location within the image. As previously described, the pattern recognition may be performed with or without the aid of fiducial marks. The location of the points from pattern recognizers 312 and 322 are analyzed by coordinate determining means 314 which analyzes the angles relative to each point from each camera, and knowing the predetermined distance between the cameras, is able to determine the desired positions and orientations. Coordinate determining means 314 also makes available the position of the user and the position and orientation of the physical object so that the stereoscopic image generator 212 may generate the stereoscopic extension image in response thereto. Coordinate determining means 314 also makes available the position of the user to coordinate determining means 214 which determines the position of the interface image relative to the user by determining the distance between the left eye and right eye images displayed on display 200 with the user's position including the distance between the user and the display and the spacing between the eyes of the user. The positions of the physical object and interface image are then compared by intersection monitor 323 which generates a control signal in response to a substantial coincidence with the position of the physical object, or its stereoscopic extension image, and the position of the stereoscopic interface image.

Figure 8:
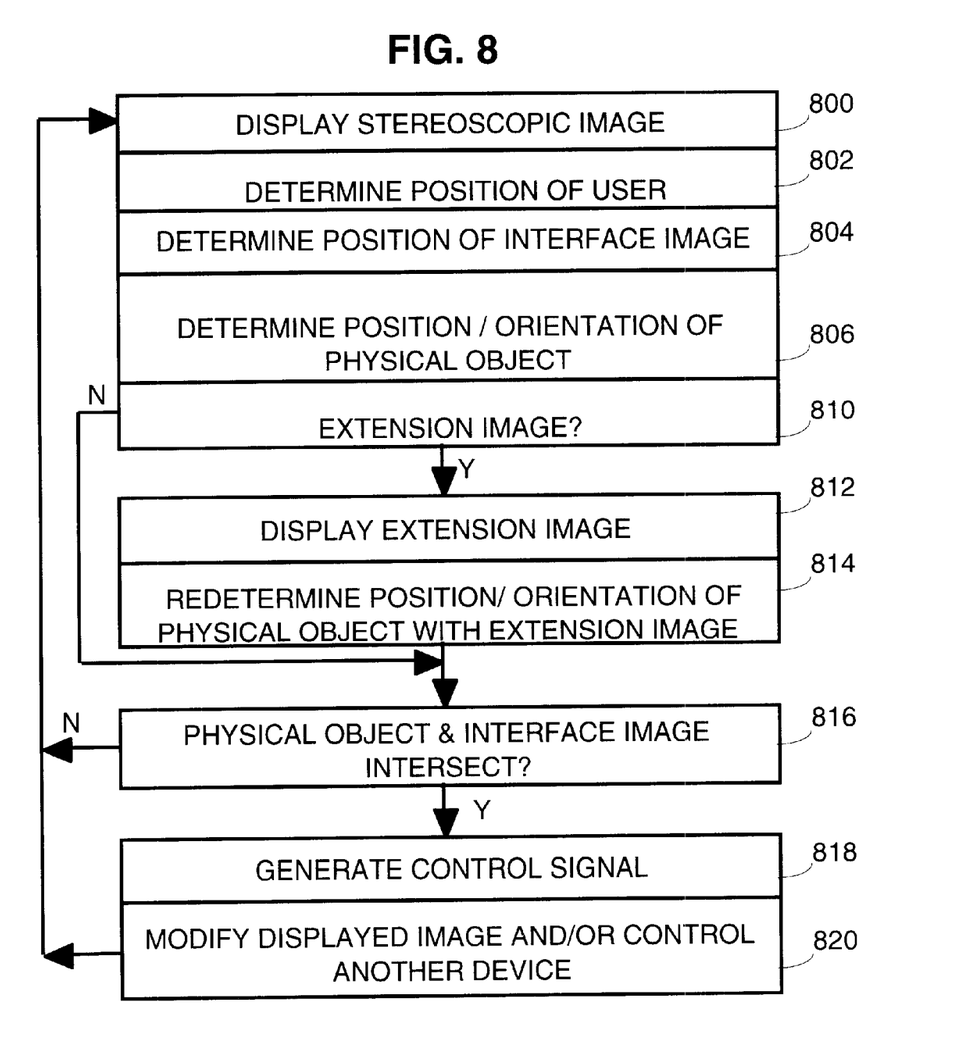
FIG. 8 shows a flow chart of a process operating in accordance with the present invention.

FIG. 8 shows a flow chart of a process operating in accordance with the present invention. In step 800, a stereoscopic image is displayed. Step 802 determines the position of the user as previously described. Note in alternate embodiments the position of the user may be predetermined. Then in step 804 the position of the stereoscopic interface image relative to the user is determined. Step 806 determines the position and orientation of the physical object and step 810 asks if and extension image is desired. If so, step 812 causes the display of the extension image and step 814 redetermines the position and orientation of the physical object with the extension image. Then step 816 determines if there is an intersection between the interface image and the physical object or its extension image. If so, step 818 generates a control signal which in step 820 modifies the displayed image and/or controls another device.

Thus what has been provided is a method and apparatus by which the intersection of a physical object and a stereoscopic object can be determined and be used to form a user interface with a computer system.

Figure 9:
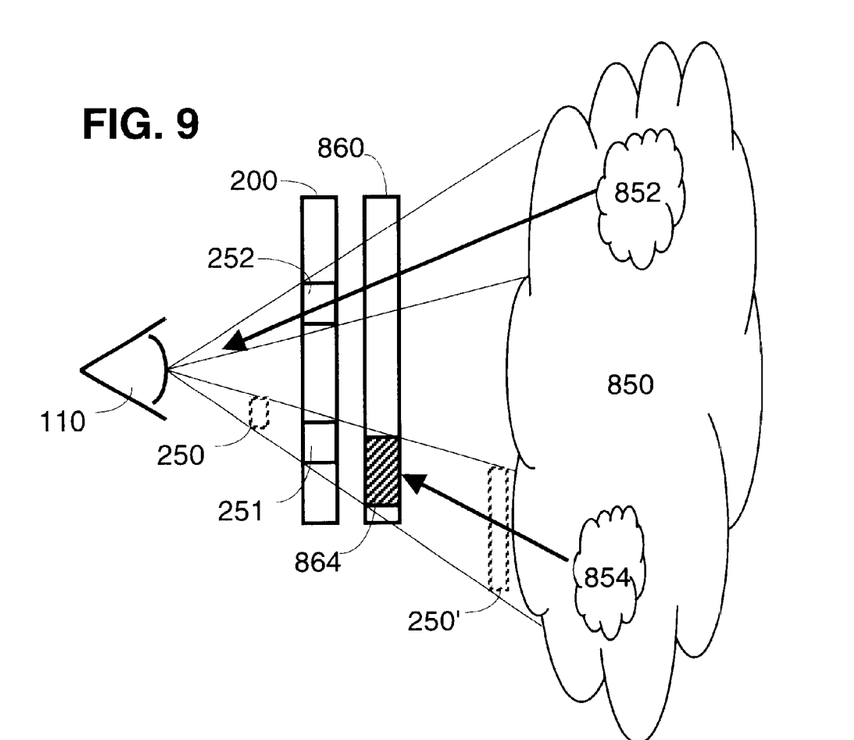
FIG. 9 shows active real image obstruction in a virtual reality display system.

FIG. 9 shows active real image obstruction in a virtual reality display system. Display means 200 is a transparent display means preferably capable of displaying a stereoscopic image 250 appearing in front of the display means or stereoscopic image 250 appearing behind the display means. Alternately, an image 251 or 252 could appear in coincidence with the display if a non-stereoscopic display were implemented, such non-stereoscopic virtual reality images are produced by displays including "teleprompters". Image 252 could alternately be a stereoscopic image if display 200 were a stereoscopic display. Images produced by display 200 correspond to virtual reality images when viewed by the user. Reality also has numerous real images including real images 850 having portion 852 and 854 corresponding to images normally observable by an observer with the naked eye 110.

The transparency of display 200 allows the virtual reality images to appear superimposed upon real images represented by reality 850. Such a system is shown in U.S. Pat. No. 5,491,510 to Gove entitled System and method for simultaneously viewing a scene and an obstructed object, or U.S. Pat. No. 5,694,142 to Dumoulin et al. entitled Interactive digital arrow (D'ARROW) three-dimensional (3D) pointing, which are hereby incorporated by reference. Thus, virtual image 252 appears superimposed upon real image 852.

The invention also includes an active real image obstructer, or real image obstruction means, 860. The active real image obstructer modifies the transparency of portions of the viewing system. The active reality obstructer preferably includes a multiplicity of individually addressable and electronically controlled light valves, and preferably includes a gray scale liquid crystal display (LCD) having pixels capable of electronically switching between substantially transparent, partially transparent and substantially opaque states. Such LCDs are know to those familiar with the art. The result is the selective obstruction of real images 850. For example, obstructer 860 has a portion 864 where light valves substantially inhibit viewing of real images 854. In addition to image 252, display 200 also displays image 250, 250' or 251. The resulting display system results in a view wherein virtual image 252 appears superimposed upon or combined with real image 852, while virtual image 250, 250' or 251 appears on a substantially opaque background. An opaque area 864 is formed by light valves of the obstructer inhibiting viewing of real images 854. Thus, real images 854 do not interfere with the viewing of virtual image 250, 250' or 251. This enhances the viewing of virtual reality image 250, 250' or 251 by provide a "dark background" background free of real images 854, while enabling virtual reality image 252 to be viewed along with real image 852.

Figure 10:
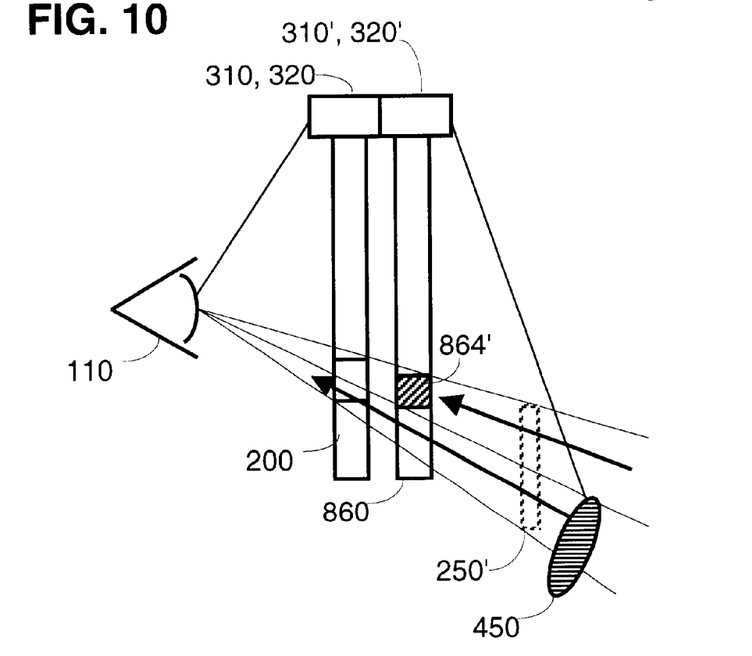
FIG. 10 shows selective real image obstruction in the virtual reality display system.

FIG. 10 shows selective real image obstruction in the virtual reality display system. As discussed with respect to previous figures, video cameras 310 and 320 determine the position of the viewer in order to determine the position of the perceived virtual reality image 250'. The transparency of display 200 allows viewing of an image of real physical object 450. Since object 450 is on the opposite side of the display system, a second set of video cameras 310' and 320' are used to determine the position of selecting object 450. In response to determining the position of object 450, real image obstruction 864' is modified to enable viewing of selector 450 so that both the real image of object 450 and virtual image 250' may be both viewed by the viewer.

In an embodiment including a stereoscopic user interface system, image 250' has an interface image, and object 450 corresponds to selecting device, such as a finger of the user. Real image obstruction 864' is modified to facilitate the user observing the object in order guide the object to a desired interface image. Note that if reality obstruction 864' of FIG. 10 were not modified in response to selecting object 450, the view of selecting object 450 would be obstructed. In the preferred embodiment, selecting object 450 is recognized independently of other real images 854 obstructed by obstruction 864. The independent recognition of selecting object 450 may be facilitated with the use of fiducial marks on the pointing device such as a ring or colored dots on the finger. Alternately pattern recognition could be performed to identify a predetermined pointing device such as the user's finger. Since the position of the user, the selecting object and display system are all known, sufficient information is available to adjust the reality obstruction 864' facilitate viewing of the pointing device by the user.

In another embodiment, a "head's up" display includes active reality obstruction. In this embodiment a transparent display is coupled with real image obstructer 860 and place a substantial distance from the viewer in order that the display may be viewed by both eyes of the viewer. The obstructer 860 allows viewing of some of the virtual images projected by the display to combined with real images viewed through the display. For other virtual images, the reality obstructer inhibits viewing real images in other portions of the display in order to enhance viewing of corresponding virtual images or to facilitate better viewing of real images through the display system. In an example of this embodiment, the display system of FIG. 1 to FIG. 6 is modified such that display 200 includes a transparent display and obstructer 860 is locate behind the display. Interface image 250 can be further incorporated into the display system to provide for a heads-up stereoscopic user interface.

Figure 11:
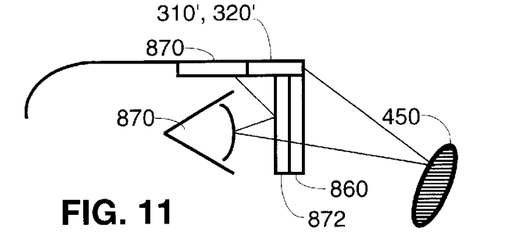
FIG. 11 shows a headset embodiment of the present invention.

FIG. 11 shows a headset embodiment of the present invention. The headset is capable of displaying stereoscopic images with a transparent display projection system. Such a system is shown in U.S. Pat. No. 5,886,822 to Spitzer entitled Image combining system for eyeglasses and face masks, which is hereby incorporated by reference. The display system includes an image projector system 870 and 872. Images are generated by image generator 870 and reflected into an eye of the viewer by reflector means 872. When a corresponding system is used with the second eye of the user, a stereoscopic image is generated. Also included is obstructer 860 which obstructs real images in certain parts of the viewing area. Video camera means 310' is used to monitor real images and adjust the reality obstruction in response thereto. For example, real image obstruction can be modified to enable viewing of selecting object 450. Since the system is part of a headset, the location of each of the user's eyes is substantially predetermined. As a result video cameras 310 and 320, which were previously used to determine the location of the user become optional. As previously discussed, the system enables the stereoscopic user interface by facilitating the user's view of the intersection between a real object and a stereoscopic interface image.

Figure 12:
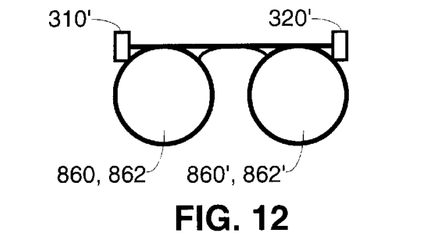
FIG. 12 shows a front view of the headset embodiment of the present invention.

FIG. 12 shows a front view of the headset embodiment of the present invention. Each lens has a virtual reality image projector and a real image obstructer 860 and 872, and 860' and 872' respectively. In the system of FIG. 11 and FIG. 12, the obstruction created by obstructers 860 and 860' is also stereoscopic, occupying a perceived space a distance in front of the user. In the preferred embodiment, the perceived distance of the obstruction is adjusted to enhance the user's view. For example, if stereoscopic image 250 is projected to appear one half meter in front of the viewer, then the stereoscopic obstruction would also be generated to appear one half meter in front of the viewer in order to enhance the viewing of image. Video cameras 310' and 320' monitor real images viewed by the user. This facilitates the stereoscopic user interface by locating a selecting object position as well as facilitates adjusting the real image obstructers in response to real images.

In alternate embodiments, the head set display system of FIG. 11 or FIG. 12 can be implemented with filter glass (polarized, colored or actively switched) viewing a common display panel.

Figure 13:
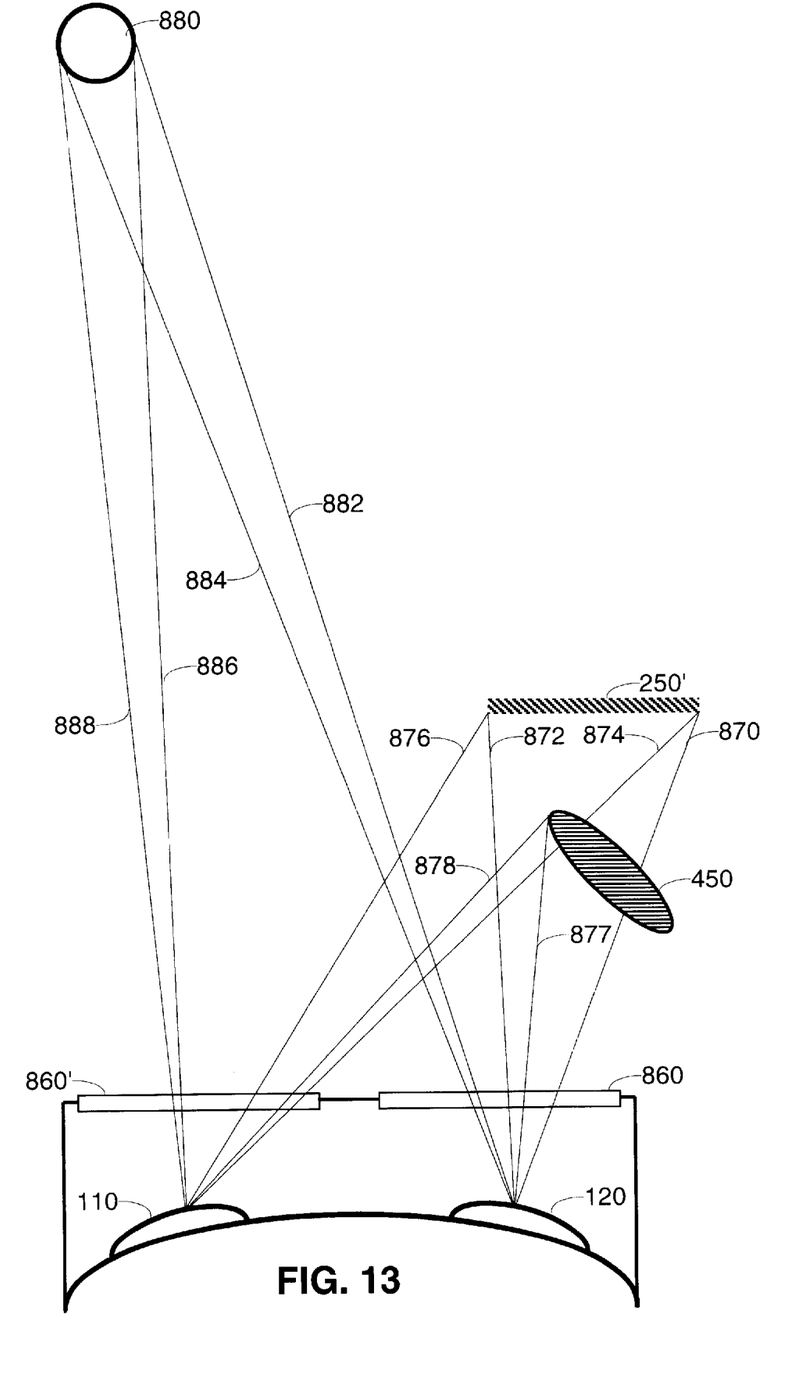
FIG. 13 shows a top view operation of a headset with active reality obstruction.

FIG. 13 shows a top view operation of a headset with active reality obstruction. The headset includes reality obstructers 860 and 860' for obstructing real images viewed by eyes 110 and 120. A virtual reality image 250' is projected in a distance in front of the viewer. In order to create a stereoscopic obstruction in coincidence with virtual image 250', an obstruction is created substantially between lines 870 and 872 on obstructer 860 and substantially between lines 874 and 876 on obstructer 860'. Note that since virtual image 450 is created by the display system, its position is inherently known by the display system. Thus, the reality obstruction corresponding to virtual image 250' may be determined by the display system at the time of generation of image 250'. Note that if the display system changes the position or size of image 250' then the position or size of the corresponding obstruction may also be changed.

FIG. 13 further shows how the active obstructions are modified in response to real objects. FIG. 13 shows objects 450 and 880. Monitoring means such as video cameras 310' and 320' may be added to the system to determine the position and/or character of the real objects. Upon determining the size and position of selecting object 450, the obstruction is correspondingly modified to facilitate viewing of the real image of the selecting object. By modifying the stereoscopic obstruction to occur substantially between lines 870 and 877 on obstructer 860 and substantially between lines 874 and 878 on obstructer 860', the real image of selecting object 450 may be viewed. This is a top view graphical analysis. A similar graphical analysis can be performed for the side view, thus generating a two dimensional real image obstruction area on obstructers 860 and 860'.

In another embodiment of the invention, the monitoring leans determines the character of the real images and obstructs their view if they interfere with viewing other virtual reality images or other real images. For example, real object 880 corresponds to a relatively bright object, such as a streetlight or the sun. Such objects produce relatively bright images that tend to interfere with viewing of either virtual reality images or other real images. Video cameras 310' and 320' determine the location an relative brightness of the real image of object 880. Then a stereoscopic obstruction occurs in substantial coincidence with the real image of object 880 by generating obstructions substantially between lines 882 and 884 on obstructer 860 and substantially between lines 886 and 888 on obstructer 860'. Note that in this application, the stereoscopic projectors 870 and 870' are optional. It is further noted that such stereoscopic obstructions may be created by the aforementioned headsup display system of FIG. 10. In such a heads-up application, if only the enhancement of viewing real images is sought, the projector 200 can become optional.

Figure 14:
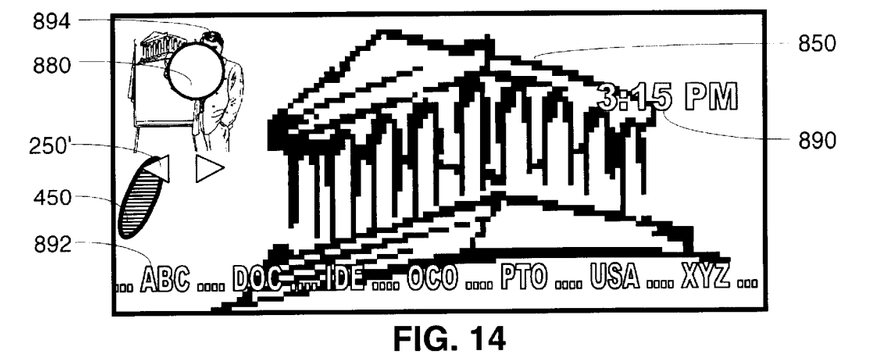
FIG. 14 shows an example of a view of a transparent display system without real image obstruction.
Figure 15:
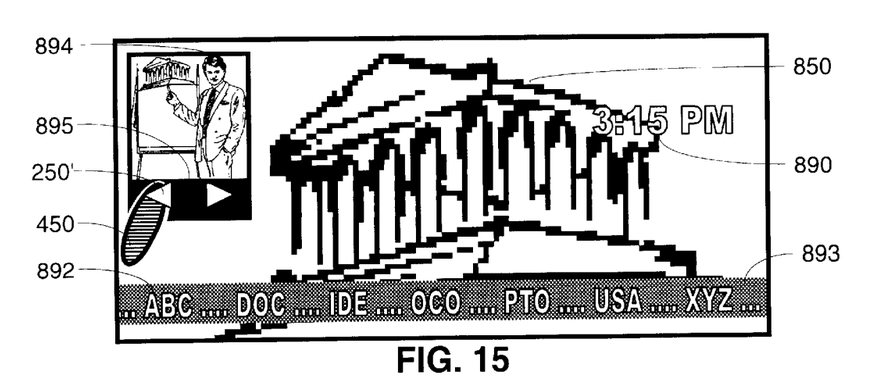
FIG. 15 shows an example view of the transparent display system with real image obstruction.

FIG. 14 shows an example of a view of a transparent display system without real image obstruction. FIG. 15 shows an example view of the transparent display system with real image obstruction. The view of reality 850 includes a real image of a building and the sun 880. A first virtual reality image 890 of a digital time of day clock is displayed superimposed on real image 850 in both FIG. 14 and FIG. 15. FIG. 14 also has a second virtual reality image of a streaming information display such as real time stock prices. The information streams from right to left towards the bottom of the display and is superimposed real image 850. Real image 850 tends to interfere with the viewing of the streaming information of virtual reality image 892. FIG. 15 shows a real image obstruction 893 in substantial coincidence with virtual reality image 892. Real image obstruction 892 substantially reduces visual interference from the real image and improves the viewing of the streaming information. FIG. 14 also shows a third superimposed virtual reality image 894 of a video image. In this example the video image is that of a lecture given on the building being observed. However, image 894 is superimposed upon the sun 880 which is substantially brighter, making at least portions of the video image difficult if not impossible to view. The image from bright object 880 may also interfere with viewing of other virtual reality images as well as the real image of the building. FIG. 15 generates a real image obstruction in substantial coincidence with virtual reality image 894 which substantially enhances its viewing. Further, creating a real image obstruction in substantial coincidence with or including the bright image 880 also enhances viewing of the other virtual reality images 890 and 892 as well as the real image of the building. Image 894 of FIG. 14 and FIG. 15 also includes a stereoscopic interface image 250' which in this example may be used to raise or lower the volume of an accompanying audio portion of the video image 894, a sound track of the speaker's lecture on the real image of the building being viewed. The real image of selector 450 is also shown. FIG. 15 shows the real image obstruction in substantial coincidence with the real image of selector 450 being removed to facilitate viewing of the real image of selecting object 450.

Referring back to the block diagram of FIG. 7, the block diagram also shows the active real image obstruction means 860 in substantial coincidence with display 200 in order create the previously described active obstruction of real images in a virtual reality display system. Obstructer 860 is controlled by obstruction controller 902 which in the preferred embodiment switches selected light valves of obstructer 860 off or on, or partially off or on in order to create a desired level of transparency or opaqueness. The obstruction controller adjusts the size, location and/or transparency of obstructions in response to manual inputs from the user from manual input means 904, inputs from an information signal used to generate images displayed on display 200, the coordinates of virtual images produced by the system from coordinates means 214 and/or in response to inputs from coordinates means 314 for determining coordinates of real objects having real images.

As previously described, it may be desirable for certain virtual reality images to be superimposed or combined with real images while other virtual reality images be viewed substantially only as virtual reality images with little or no interference from real images. Stereoscopic image generator 212 communicates the coordinates of the virtual images to obstruction controller 902 which generates the obstructions accordingly. The amount of transparency of each obstruction may be varied between substantially totally transparent through several levels of decreasing transparency to substantially opaque. If the virtual reality image having a corresponding real image obstruction is moved or resized, the corresponding real image obstruction is also moved or resized by obstruction controller 902. Such a virtual realty image may be moved in response to a manual input from the viewer.

For example, the viewer may be watching a high definition movie in a small window with a corresponding partially transparent real image obstruction while traveling through an airport and on the way to a seat on the airplane. The transparency of the portions of the viewing area allows the viewer to do may things while viewing the movie in the small window. The viewer may use the real images navigate the crowds and corridors of the airport, communicate with airline and security personnel and find an assigned seat on the airplane. Once seated, the viewer may desire to substantially enlarge the viewing window of the movie and further reduce the transparency of the movie's real image obstruction in order to improve the viewing of the movie. Such adjustments can be done via manual inputs. The manual adjustments may be made via several means including switches or buttons associated with the display system or via a stereoscopic user interface system as previously described.

The virtual reality image and its corresponding real image obstruction may be moved or resized in response to an information signal used to generate virtual reality images. For example, a substantially real time stock quote information stream is being displayed, and the user desires to receive alerts based upon a certain financial trigger. In an event of the trigger, the size of the image could be doubled to facilitate a second display of information related to the trigger. This is an example of the size of the virtual reality image, and its corresponding real image obstruction, vary in response to the information signal used for generating the virtual reality image. Furthermore, the transparency of the corresponding real image obstruction could be reduced in response to the trigger. This is an example of changing the size and/or transparency of the real image obstruction in response to an information signal used for generating the virtual reality image.

Obstruction controller 902 also receives coordinate information from coordinates means 314 in order to modify obstructions to facilitate viewing of a real image of a selecting object in an embodiment implementing the aforementioned stereoscopic user interface.

Coordinates means 314 also provides coordinates of substantially bright portions of the real image in order that corresponding real image obstructions may be generated to reduce the viewed brightness of the bright portions of the real image. This has the advantage of improving the viewing of both virtual reality images and other real images.

Coordinates means 314 is capable of determining the ambient brightness of the real images. In one embodiment, the ambient brightness may be used to adjust the transparency of the entire obstructer 860. For example, if the ambient brightness of the real images doubled, the transparency of each pixel of the obstructer 860 would be substantially halved in order to maintain a substantially constant contrast ratio between the virtual reality images and the real images. If first and second portions of the obstructer had 100% and 50% transparency respectively, then upon a doubling of the ambient light, the first and second portions of the obstructer would be correspondingly adjusted to 50% and 25% transparency. Other nonliner adjusting relationships between obstructer transparency, real image ambient light and virtual reality image brightness are also anticipated. In simplified embodiment which detects substantially only ambient light, the means for determining coordinates of real images is not necessarily needed. Thus, the video cameras 310 and 320, pattern recognizers 312 and 322, and coordinate determining means 314 could be substituted for an simpler and lower cost ambient light sensor.

Figure 16:
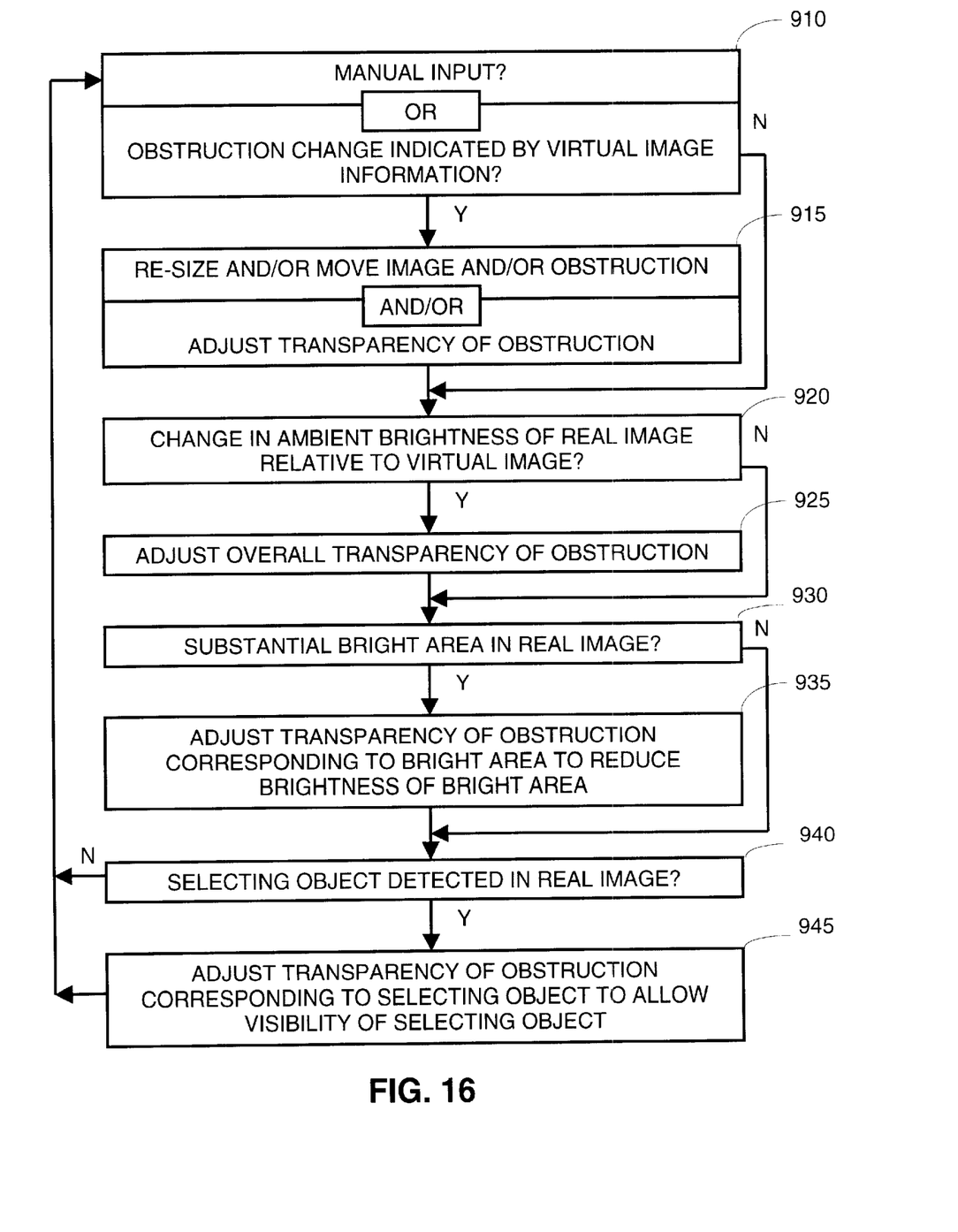
FIG. 16 shows a flowchart of a method operating in accordance with the present invention.

FIG. 16 shows a flowchart of a method operating in accordance with the present invention. Step 910 checks for either a manual input or information including the virtual image indicating the need for a change in real image obstruction. If found, then step 915 resizes, and/or moves the image and/or real image obstruction, and/or changes the transparency of the obstruction. From either step 910 or 915, step 920 checks for a change in ambient brightness of the real image and if found adjusts the overall transparency of the obstruction means in step 925. Thereafter, step 930 checks for a substantially bright area in the real image and if found step 935 adjusts the transparency of an obstruction corresponding to the bright area in step 935. Thereafter, step 940 determines if a selecting object is included in the real image, and if found adjusts the transparency of the obstruction to facilitate viewing of the selecting object in step 945. Thereafter the program returns to step 910.

In an alternate embodiment of selective real image obstruction of a virtual reality display system, the real image obstruction is a passive real image obstruction of a predetermined area of the display system. For example, real image obstruction 893 of FIG. 14 and FIG. 15 could be a permanent blacked out obstruction on the headset, a thick black stripe towards the bottom of each lens of the headset. In this way streaming stock information image 892 could always been seen with out interference from real images: other virtual reality images, such as 890 and 894, would always appear combined with or superimposed upon real images. In this embodiment, the thick black stripe real image obstructer may be substantially unrelated to the display means used for projecting virtual reality images. This also enables active real image obstructer 860 to become an optional component of the display system. A further enhancement of the selective obstruction includes blocking only certain spectrum of visible light of real images with either the passive or active real image obstructer. This enhances viewing of a virtual image in the color region of the real image obstruction. For example, real image obstructer 893 may selectively block blue light causing real images in area 893 to appear substantially yellow. This substantially enhances viewing of the information stream 892, particularly if the information stream is projected with a blue color. As a further embodiment, the entire display system can selectively block of filter a portion of the spectrum of light from real images (such as blue light) and with the display system projecting desired information (such as text, graph or line art) with a corresponding (blue) color in order to enhance viewing of the virtual (text, text graph or line art) images when viewed superimposed upon or combined with filtered light from the real images. Other virtual reality images (such a color video) may be projected in full color and viewed in combination with filtered light from the real images, or the real images may be substantially totally obstructed by an active image obstructer blocking substantially all spectrum of visible light as previously disclosed.

Thus, what has been provide is a virtual reality viewing system that provides for the advantages of both transparent and opaque viewing systems while reducing the disadvantages of both by actively obstructing views of real images to enhance views of select virtual reality images as well as views or other real images.

We claim:

1. In a headset with a variable position real image obstruction, a method of enhancing viewing of a portion of real images viewed through the headset system comprising the steps of:

determining a position of a substantially bright portion of the real images;

selecting an obstruction position from a plurality of obstruction positions in response to said step of determining; and generating a real image obstruction for a portion of the real images viewed through the headset system in response to said step of selecting, wherein the real image obstruction is substantially inclusive of the bright portion.

2. The headset system of claim 1 wherein the headset is a stereoscopic headset display system and wherein the real image obstruction generated by said step of generating is a stereoscopic real image obstruction and appears in substantial coincidence with the substantially bright portion of the real images.

3. The method according to claim 1 wherein the headset is a headset display system and is also able to display virtual images viewed in combination with the real images and the method further comprises the steps of:

generating a virtual image at a virtual image position;

selecting a second obstruction position from the plurality of obstruction positions in response thereto; and generating a second real image obstruction for a second portion of the real images viewed through the headset system in response thereto, wherein the second real image obstruction is in substantial coincidence with the virtual image position, thereby enhancing viewing of the virtual image.

4. The method according to claim 1 wherein the real image obstruction is substantially inclusive of the real images and the method further comprises the steps of:

determining an amount of ambient light associated with the real images; and modifying an amount of obstruction of the real image obstruction in response to the amount of ambient light.

5. The method according to claim 3 wherein the second real image obstruction is substantially inclusive of the real images and the method further comprises the steps of:

determining an amount of ambient light associated with the real images; and modifying an amount of obstruction of the real image obstruction in response to the amount of ambient light.

6. The method according to claim 3 wherein the headset is a stereoscopic headset display system and wherein the virtual image includes a stereoscopic interface image appearing within an interface space viewable by a viewer of the stereoscopic headset display system, the method further comprising the step of:

determining an intersection of the interface space including the stereoscopic interface image and a physical selecting object having a real image viewable by the viewer of the stereoscopic headset display system; and generating a control signal in response thereto.

7. The method according to claim 6 further wherein said step of generating the second real image obstruction obstructs viewing of real images within the interface space while enabling viewing of the real image of the selecting object, thereby allowing the viewer to view the intersection of the selecting object with the stereoscopic interface image.

8. The method according to claim 6 wherein the selecting object corresponds to a finger of the viewer.

9. The method according to claim 3 wherein said step of generating the virtual image generates the virtual image in response to an information signal, and said step of generating the second real image obstruction further modifies at least a size, shape or location of the second real image obstruction in response to the information signal.

10. The method according to claim 3 wherein said step of generating the virtual image generates the virtual image in response to an information signal, and said step of generating the second real image obstruction further modifies at least an amount of obstruction of real images by the second real image obstruction in response to the information signal.

11. In a headset display system able to display virtual images viewed in combination with real images viewed through the headset display, a method comprising the steps of:
determining a position of a substantially bright portion of the real images;
generating a real image obstruction substantially inclusive of the bright portion in response to said step of determining;
generating a virtual image at a virtual image position; and
generating a second real image obstruction in substantial coincidence with the virtual image position wherein the real images not obstructed by the first or second real image obstructions are substantially unobstructed.

12. The method according to claim 11 wherein the real image obstruction is substantially inclusive of the real images and the method further comprises the steps of:
determining an amount of ambient light associated with the real images; and
modifying an amount of obstruction of the second real image obstruction in response to the amount of ambient light.

13. The method according to claim 11 wherein the headset display system is a stereoscopic headset display system and wherein the virtual image includes a stereoscopic interface image appearing within an interface space viewable by a viewer of the stereoscopic headset display system the method further comprising the step of:
determining an intersection of the interface space including the stereoscopic interface image and a physical selecting object having a real image viewable by the viewer of the stereoscopic headset display system; and
generating a control signal in response thereto.

14. The method according to claim 13 further wherein
said step of generating the second real image obstruction obstructs viewing of real images within the interface space while enabling viewing of the real image of the selecting object, thereby allowing the viewer to view the intersection of the selecting object with the stereoscopic interface image.

15. The method according to claim 11 wherein
said step of generating the virtual image generates the virtual image in response to an information signal, and
said step of generating the second real image obstruction further modifies at least a size, shape or location of the second real image obstruction in response to the information signal.

16. The method according to claim 11 wherein
said step of generating the virtual image generates the virtual image in response to an information signal, and
said step of generating the second real image obstruction further modifies at least an amount of obstruction of real images by the second real image obstruction in response to the information signal.

17. In a headset display system with a variable position real image obstruction and able to display virtual images viewed in combination with real images viewed through the headset display, a method comprising the steps of:
determining a position of a substantially bright portion of the real images;
selecting an obstruction position from a plurality of obstruction positions in response to said step of determining;
generating a real image obstruction for a portion of the real images viewed through the headset system in response to said step of selecting, wherein the real image obstruction is substantially inclusive of the bright portion; and
generating a virtual image viewable in combination with the real images.

18. The method according to claim 17 further comprising the steps of:
selecting a second obstruction position from the plurality of obstruction positions in response said step of generating the virtual image; and
generating a second real image obstruction in substantial coincidence with the virtual image position.

19. The method according to claim 17 wherein
said step of generating the virtual image generates the virtual image at a virtual image position appearing within an interface space viewable by a viewer of the headset display system, and the method further comprises the steps of:
determining an intersection of the interface space including the interface image and a physical selecting object having a real image viewable by the viewer of the headset display system; and
generating a control signal in response thereto.

20. The method according to claim 19 further comprising the step of
generating a second real image obstruction in substantial coincidence with the virtual image position.

21. The method according to claim 20 further wherein
said step of generating the second real image obstruction obstructs viewing of real images within the interface space while enabling viewing of the real image of the selecting object, thereby allowing the viewer to view the intersection of the selecting object with the stereoscopic interface image.

22. The method according to claim 17 wherein
said step of generating the virtual image generates virtual image in response to an information signal, and
said step of generating the second real image obstruction further modifies at least a size, shape or location of the second real image obstruction in response to the information signal.

23. The method according to claim 17 wherein
said step of generating the virtual image generates the virtual image in response to an information signal, and
said step of generating the second real image obstruction further modifies at least an amount of obstruction of real images by the second real image obstruction in response to the information signal.

24. A headset with a variable position real image obstruction for enhancing viewing of real images viewed through the headset comprising:
a position determiner for determining a position of a substantially bright portion of the real images and selecting an obstruction position from a plurality of obstruction positions in response thereto; and
an obstruction generator for generating a real image obstruction at the selected obstruction position substantially inclusive of the bright portion.

25. The headset of claim 24 wherein the real image obstruction is substantially inclusive of the real images and the headset further comprises
an ambient light determiner for determining an amount of ambient light associated with the real images, and wherein said obstruction generator further modifies an amount of obstruction of the real image obstruction in response to the ambient light.

26. The headset of claim 24 wherein the headset is also able to display virtual images viewable in combination with the real images and the headset further comprising:

an image generator for generating a virtual image at a virtual image position, wherein said obstruction generator generates a second real image obstruction in substantial coincidence with the virtual image position, thereby enhancing viewing of the virtual image.

27. The headset of claim 26 wherein the real image obstruction is substantially inclusive of the real images and the headset further comprises an ambient light determiner for determining an amount of ambient light associated with the real images, and wherein said obstruction generator further modifies an amount of obstruction of the second real image obstruction in response to the ambient light.

28. The headset according to claim 26 wherein the headset is a steroscopic headset and wherein the virtual image includes a sterescopic interface image appearing within an interface space viewable by a viewer of the headset, the headset further comprising a monitor for determining an intersection of the interface space including the stereoscopic interface image and a physical selecting object having a real image viewable by the viewer of the stereoscopic headset display system and for generating a control signal in response thereto.

29. The headset according to claim 28 further wherein the second real image obstruction obstructs viewing of the real images within the interface space while enabling viewing of the real image of the selecting object, thereby allowing the viewer to view the intersection of the selecting object with the stereoscopic inteface image.

* * * * *